US 7,860,886 B2

(12) United States Patent
Loftesness

(10) Patent No.: US 7,860,886 B2
(45) Date of Patent: Dec. 28, 2010

(54) STRATEGY FOR PROVIDING QUERY RESULTS BASED ON ANALYSIS OF USER INTENT

(75) Inventor: David E. Loftesness, San Francisco, CA (US)

(73) Assignee: A9.Com, Inc., Palo Alto, CA (US)

(*) Notice: Subject to any disclaimer, the term of this patent is extended or adjusted under 35 U.S.C. 154(b) by 122 days.

(21) Appl. No.: 11/537,004

(22) Filed: Sep. 29, 2006

(65) Prior Publication Data

US 2008/0082518 A1    Apr. 3, 2008

(51) Int. Cl.
G06F 17/30 (2006.01)
(52) U.S. Cl. .............. 707/771; 707/765; 707/999.1; 707/999.003; 707/999.005; 705/5; 705/10
(58) Field of Classification Search .............. 707/3, 707/5, 100; 705/5, 10, 14
See application file for complete search history.

(56) References Cited

U.S. PATENT DOCUMENTS

| 6,134,532 | A  | * | 10/2000 | Lazarus et al. ............. 705/14 |
| 6,647,383 | B1 | * | 11/2003 | August et al. .............. 707/3 |
| 2003/0229537 | A1 | * | 12/2003 | Dunning et al. ............. 705/10 |
| 2005/0144158 | A1 | * | 6/2005  | Capper et al. .............. 707/3 |
| 2005/0278362 | A1 | * | 12/2005 | Maren et al. ............... 707/100 |
| 2006/0053065 | A1 | * | 3/2006  | Bowman et al. ............. 705/26 |
| 2006/0149622 | A1 | * | 7/2006  | Baluja et al. .............. 705/14 |
| 2006/0195362 | A1 | * | 8/2006  | Jacobi et al. .............. 705/14 |
| 2007/0208730 | A1 | * | 9/2007  | Agichtein et al. ........... 707/5 |
| 2007/0288447 | A1 | * | 12/2007 | Andris et al. .............. 707/5 |
| 2008/0028010 | A1 | * | 1/2008  | Ramsey .................... 707/205 |
| 2008/0097822 | A1 | * | 4/2008  | Schigel et al. ............. 705/10 |

OTHER PUBLICATIONS

PCT Search Report and Written Opinion of the International Searching Authority, Jun. 18, 2008, International Application No. PCT/US07/80011, 8 pages.
Glover, et al., "Improving Category Specific Web Search by Learning Query Modifications", IEEE Computer Society, In the Symposium on Applications and the Internet, SAINT, San Diego, CA, Jan. 2001, pp. 23-31, Available at <<http://citeseerx.ist.psu.edu/viewdoc/summary?doi=10.1.1.11.8325>>.
Jansen, et al., "Determining the Infomational, Navigational, and Transactional Intent of Web Queries", Elsevier Ltd., Information Processing & Management, vol. 44, Issue 3, pp. 1251-1266, May 22, 2007.
Jansen, et al., "Determining the User Intent of Web Search Engine Queries", In the Proceedings of the 16th International Conference on World Wide Web, 2007, Banff, Alberta Cananda, pp. 1149-1150, Available at <<http://www2007.org/posters/poster989.pdf>>, 2007.
Lee, et al., "Automatic Identification of User Goals in Web Search", WWW 2005, Chiba, Japan, pp. 391-400.
Rose, et al., "Understanding User Goals in Web Search", WWW 2004, May 2004, New York, New York, USA, pp. 13-19.
U.S. Appl. No. 12/047,237, filed Mar. 12, 2008, Dicker, "Classifying Search Strings".

* cited by examiner

*Primary Examiner*—Cam Y Truong
*Assistant Examiner*—Dung K Chau
(74) *Attorney, Agent, or Firm*—Lee & Hayes, PLLC

(57) ABSTRACT

A strategy is described for responding to a user's query based on a consideration of the user's intent in entering the query. The user's intent, in turn, is determined by examining prior query-related behavior of a population of users.

33 Claims, 8 Drawing Sheets

STRATEGY FOR PROVIDING QUERY RESULTS BASED ON ANALYSIS OF USER INTENT

BACKGROUND

Numerous search tools exist for allowing users to query network-based databases. In one rudimentary tool, a user enters a query that is related to a particular item being sought. The tool can identify those items that include the query in their respective titles. The tool can then generate a list that identifies the matching items.

The above strategy works well in those cases in which the user is indeed attempting to pinpoint a sought-after item by entering one or more words that are likely to be present in the item's title. In other instances, however, the user may be employing a different strategy to locate a desired item. For example, the user may enter the query "country music" to describe the subject of items that the user wishes to peruse. A title-based query-generating function will favor items that have the query "country music" in their titles. These results may fail to properly emphasize the items that are most relevant to the user's theme-related query.

For at least the above-identified illustrative reasons, there is a need in the art for a more satisfactory strategy for responding to user queries.

SUMMARY

A strategy is described for responding to a user's query based on a consideration of the user's intent in entering the query. The user's intent, in turn, is determined by examining prior query-related behavior of a population of users.

More specifically, the strategy can employ two operations: a data mining operation and a query operation. According to one illustrative implementation, the data mining operation involves recording purchases and other selections made by users upon receiving search results (where the search results, in turn, are generated in response to queries entered by the users). The data mining operation further involves identifying, for each user query, a pattern which evinces a predominate intent of the users in entering the query.

The query operation involves receiving a particular query from an individual user. The query operation also involves identifying, based on the prior analysis performed by the data mining operation, the user's probable intent in entering the particular query. The query operation then involves selecting and applying a result-generating function that is best suited to the identified intent. One illustrative result-generating function is a title-based function which emphasizes result items that include the particular query in their titles. Another illustrative result-generating function is a theme-based function which emphasizes result items that have a thematic relationship to the particular query, but may not include the query in their respective titles. Still other functions can be used.

Additional illustrative implementations and attendant benefits are described in the following.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth a strategy for responding to a user's query in a way that more fully takes into account the user's intent in entering the query. The strategy can be manifested in various systems, methods, apparatuses, computer readable media, data structures, and other elements.

The term "item" as used herein refers to any kind of object. In one example, an item may refer to something that can be acquired by the user, such as media content (a book, a musical piece, etc.), other tangible article (e.g., an automobile, a camera, clothing article, etc.), a service, downloadable digital content of any nature, and so forth. In these cases, the term "item" can specifically refer to an electronic record that corresponds to an object, or the actual object itself. In other cases, an "item" can correspond to an electronic record that has no merchandisable counterpart.

This disclosure includes the following sections. Section A describes an illustrative system for receiving and responding to user queries. Section B describes illustrative procedures that explain the operation of the system of Section A.

A. Illustrative Systems

As a preliminary matter, the terms logic, module, functionality, or system generally represent hardware, software, firmware or a combination of these elements, or yet some other kind of implementation. For instance, in the case of a software implementation, the terms logic, module, functionality, or system represent program code that perform specified tasks when executed on a processing device or devices (e.g., CPU or CPUs). The program code can be stored in one or more machine-readable media.

The term machine-readable media or the like refers to any kind of medium for retaining information in any form, including various kinds of storage devices (magnetic, optical, static, etc.). The term machine-readable media also encompasses transitory forms of representing information, including various hardwired and/or wireless links for transmitting the information from one point to another.

A.1. Illustrative Structural Components of the System

Figure 1:
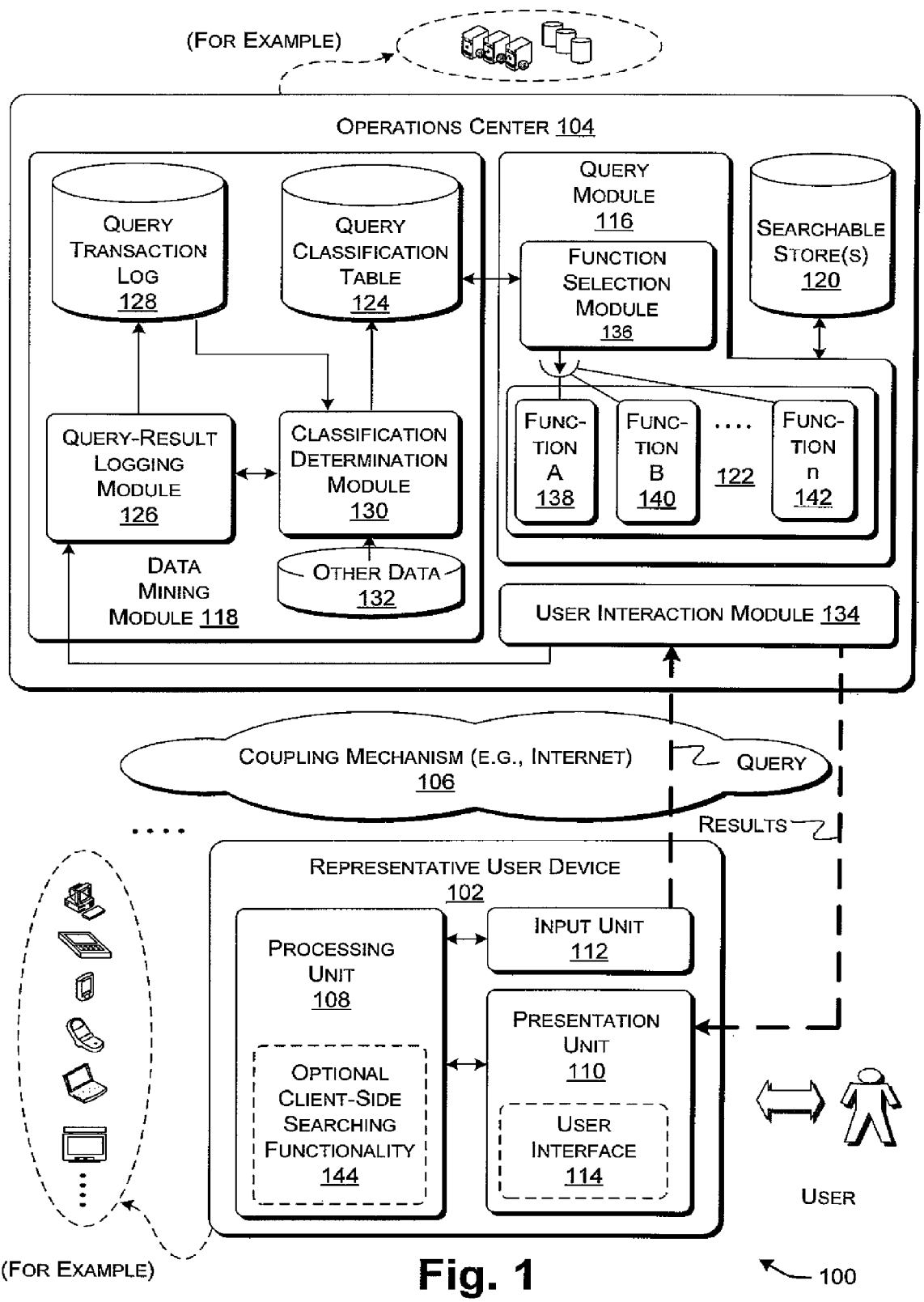
FIG. 1 shows an illustrative system for responding to user queries, in which different query-generating functions are applied to handle different types of respective queries.

FIG. 1 shows an overview of one illustrative system 100 for receiving and responding to user queries. In system 100, a plurality of devices, such as representative user device 102, are coupled to an operations center 104 by a coupling mechanism 106. The explanation provided below with respect to the representative device 102 likewise applies to other devices (not shown), unless otherwise noted.

Beginning with the hardware-related aspects of the system 100, the operations center 104 can be implemented as one or more server computers (e.g., as a "farm" of such computer servers) and associated databases. The architecture of the operations center 104 can be separated into front-end components that interface directly with the device 102 and back-end components that can perform offline analysis. Generally, the components of the operations center 104 can be located at a single site, or distributed over plural sites, and managed by a single entity or plural entities.

The device 102 represents any kind of electronic unit which can interact with the operations center 104 via the coupling mechanism 106. In the most common case, the device 102 corresponds to a computer device, such as a personal computer, laptop computer, and so forth. But the device 102 may also correspond to a mobile telephone, a Personal Digital Assistant (PDA) device, a set-top box coupled to a television, a stylus-type input device, any kind of wearable computer, an electronic book-reader device, a personal media player, a game console device, and so forth. In any event, the device 102 can comprise as main parts: a processing unit 108; a presentation unit 110; and an input unit 112. The processing unit 108 generally corresponds to functionality (e.g., software logic, and/or circuitry, etc.) for processing information. The presentation unit 110 generally corresponds to any mechanism or combination of mechanisms for presenting the processed information. For example, the presentation unit 110 can present a graphical user interface 114 for interacting with the user. The input unit 112 generally corresponds to any mechanism or combination of mechanisms for inputting data and instructions to the processing unit 108.

Figure 6:
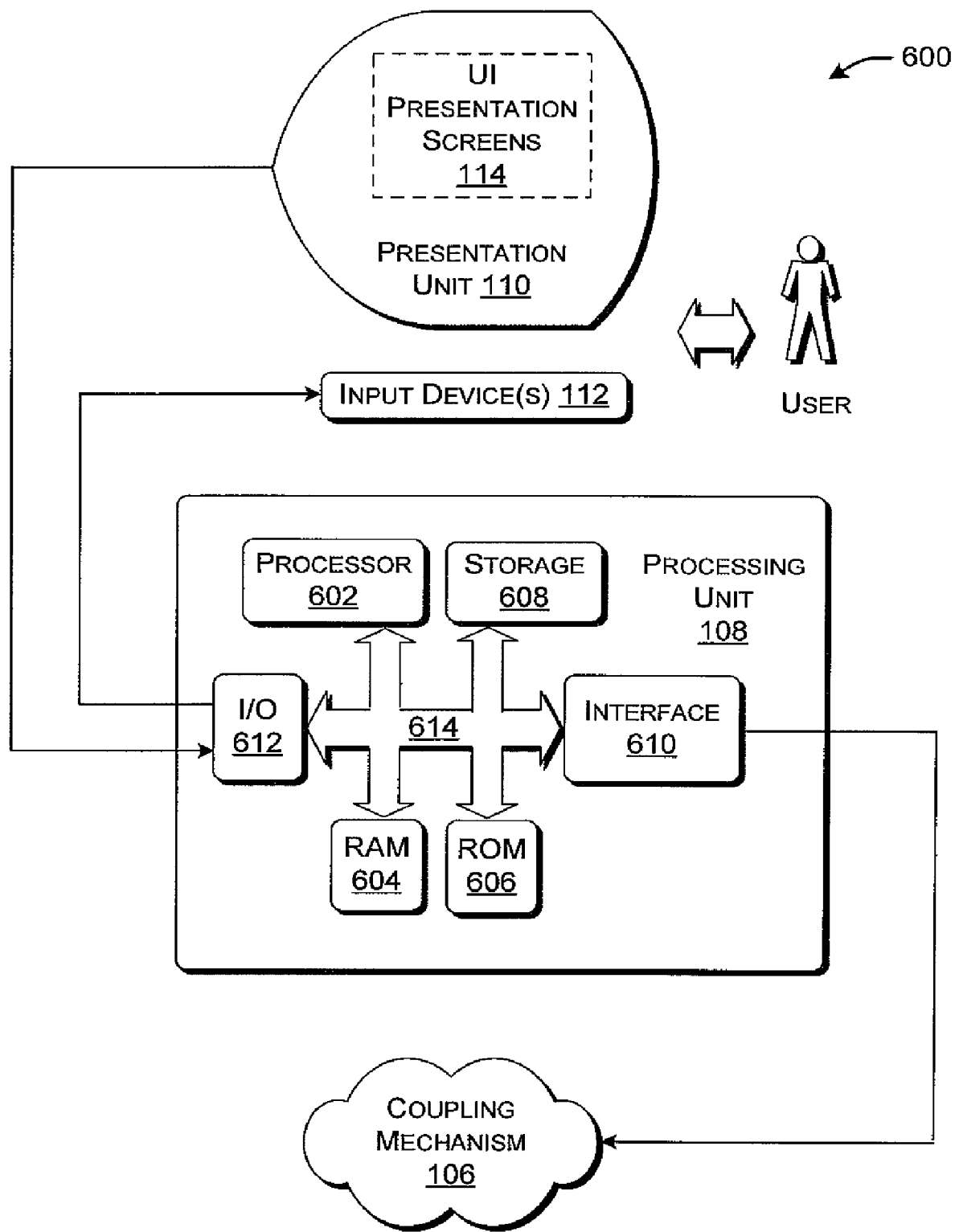
FIG. 6 shows illustrative processing functionality for implementing any aspect of the system shown in FIG. 1.

FIG. 6, to be discussed below, provides additional details regarding equipment that can be use to implement any aspect of the operations center 104 or the representative device 102.

The coupling mechanism 106 can correspond to any kind of communication conduit or combination of communication conduits. In the case most commonly evoked in this disclosure, the coupling mechanism 106 corresponds to a wide area network, such as the Internet. However, the coupling mechanism 106 can alternatively, or in addition, comprise other kinds of communication conduits such as an intranet, point-to-point coupling arrangement, and so forth. In any case, the coupling mechanism 106 can include any combination of hardwired links, wireless links, routers, repeaters, gateways, name servers, and so forth (not shown), governed by any protocol or combination of protocols.

A.2. Overview of Search-related Components of the System

The functional aspects of the system 100 are now set forth in greater detail, starting with the operations center 104. In one case, the operations center 104 may represent a website or multiple websites maintained by a single entity or multiple entities. The operations center 104 can handle requests from the representative device 102, and can serve, in response, various web pages that can be rendered at the device 102 (e.g., using browsing functionality implemented by the device 102).

For example, to set forth one concrete application, the operations center 104 can represent a merchant website that allows access to one or more items. In this context, an item can represent anything that the merchant wishes to offer for sale, or that others using the merchant's website wish to offer for sale. An item can include a product, a service, or some other type of merchandisable unit. In this environment, the user can use the device 102 to enter a query in the form of one or more component alphanumeric key terms. The operations center 104 responds by providing query results. The query results inform the user of zero, one, or more items that match the user's query.

The above-described merchant-related environment is only representative. In other cases, the operations center 104 can maintain or otherwise provide access to databases of other kinds of items, such as purely informational items or other items that are not necessarily being offered for sale by a merchant. For example, the operations center 104 can perform the role of a web surfing engine by matching the user's queries against records of websites hosted by various entities on the Internet. In another case, the operations center 104 can match the user's queries in a company-specific or other organizational setting, providing documents or other information that are local to the company or organization. Still other applications are envisioned.

By way of overview, the operations center 104 includes a query module 116 and a data mining module 118. The purpose of the query module 116 is to receive user queries, search one or more stores 120 based on the queries, and return output results to the users. In performing this task, the query module 116 can rely one any one of a set of result-generating functions 122. A result-generating function broadly refers to any strategy that is used to produce output results to be sent to the users. In one case, "result-generating" refers to the ordering of search results that have already been obtained through a separate result extraction process. In another case, "result generating" refers to the result extraction process. In another case, "result generating" refers to a combination of result extraction and result ordering. Still further implementations and interpretations are possible.

The purpose of the data mining module 118 is to detect patterns pertaining to queries entered by users. That is, upon entering a query and receiving search results, users may perform various actions, such as purchasing one of the items identified in the results, and so forth. The data mining module 118 examines, for each query, the actions taken by the users to determine whether these actions collectively reveal a pattern. The pattern may reflect a common search strategy being applied by the users. More generally, the pattern may reflect the search-related mindset or intent of the users in entering a particular query. The data mining module 118 creates a query classification table 124 (or more generally, classification mapping information) that summarizes the results of its analysis. For instance, the query classification table 124 may store a set of queries that users have entered, along with information regarding the users' probable intent in entering these queries.

The query module 116 is configured to rely on the analysis performed by the data mining module 118 in responding to a particular query of an individual user. The query module 116 can operate on a real-time basis (e.g., where the user receives a response very quickly after entering the query) or on a non-real time basis (e.g., where the user receives a response that is noticeably delayed with respect to the query). More specifically, when the user enters the particular query, the query module 116 can access the query classification table 124 to determine the probable intent of the user in entering the particular query. As explained above, the probable intent is formed based on the collective behavior of a population of users who have previously entered this same query. The query module 116 can then select the result-generating function that is best suited for the user's intent, and use that result-generating function to supply output results to the user. By virtue of the above approach, the system 100 is more likely to generate results that properly emphasize the information being sought by the user.

In one example, a single entity may administer both the query module 116 and the data mining module 118. In another case, a first entity can administer the query module 116 and a second entity can administer the data mining module 118. In the latter case, for instance, a commercial provider can generate a query classification table 124 that can be made available to one or more other commercial entities which provide search services.

Likewise, the searchable store 120 can be associated with any entity, such as the entity which administers the query module 116. In one case, as described above, the searchable store 120 can store information regarding items that are being sold by the entity that administers the query module 116. But in other applications, the entity which administers the query module 116 may not also own or control the contents of the searchable store 120. Still other business-related applications are possible.

An overview of an illustrative scenario involving the use of the system 100 is presented immediately below. A later subsection delves into this scenario in greater detail.

Assume that the data mining module 118 collects a variety of information regarding the behavior of a population of users who have entered a certain query, such as the query "crying." This behavior may indicate that the users who have entered the query "crying" were predominately interested in items that include the word "crying" in their titles. As such, the data mining module 118 can determine that a significant number of users who entered the query "crying" eventually purchased an item that has a title that contains the word "crying."

In contrast, assume that the data mining module 118 also collects a variety of information regarding the behavior of a population of users who have entered another query, such as "country music." This behavior may indicate the users who have entered this query were predominately interested in items that had only a general or thematic bearing on the topic of "country music," rather than items that specifically contained the query "country music" in their respective titles. As such, the data mining module 118 can determine that a significant number of users who entered the query "country music" eventually purchased an item that had a thematic relation to the subject of country music.

Based on above-described analysis, the data mining module 118 can store an entry in the classification table 124 which indicates that the query "crying" primarily expresses the users' intent to conduct a title-based inquiry. The data mining module 118 can store an entry in the classification table 124 which indicates that the query "country music" primarily expresses the users' intent to conduct a theme-based inquiry.

Now assume that, after the classification table 124 has been formed, a new user enters the query "crying." In response, the query module 116 consults the query classification table 124 to determine that the query "crying" has been flagged as being associated with a title-based search. The query module 116 uses this insight to select one of the result-generating functions 122 that is specifically adapted for processing title-based queries. For example, assume that a first query-generating function ranks search results in a manner that emphasizes result items that have titles that match the entered query. A second query-generating function ranks search results in a manner that emphasizes result items that are thematically related to the entered query, but which may not have titles that also include the query. Based on the classification table 124, the query module 116 selects the first result-generating function to provide output results to the user. This provision makes it more likely that result items that contain the word "crying" in their title will be prominently featured in the results.

The categories of title-based intent and theme-based intent are only two examples. There are many other applications, some of which are identified below:

The data mining module 118 can examine query-related user behavior to detect a brand-based pattern of query. If this pattern applies, when the users enter queries, they are particularly interested in investigating items associated with a particular product brand. For example, hypothetically, when users enter the query "Boston lager," they may be, more often than not, attempting to identify a specific brand of beer, and not a general class of beers.

The data mining module 118 can examine query-related user behavior to detect an adult-based pattern of query. If this pattern applies, when the users enter queries, they are particularly interested in investigating items associated with adult product items.

The data mining module 118 can examine query-related user behavior to detect a category-related pattern of query. For example, consider the case in which the user enters the query "Beatles." There are different categories of products that are associated with this query, including CDs, DVDs, artwork, clothing articles, and so forth. The data mining module 118 can examine the behavior of a large number of users to determine whether the users predominately were attempting to target a particular product category (such as CDs) when they entered the query "Beatles."

The data mining module 118 can examine query-related user behavior to detect a temporal-related pattern of query. For instance, the data mining module 118 can determine whether, when users enter a particular query, they are predominately attempting to target more recent items, or perhaps older items (e.g., antiques). For example, the data mining module 118 can hypothetically determine that users who enter the query "XML" are, more often than not, interested in books which explain XML technology that have been published in the last year.

A.3. Illustrative Data Mining Component

With the above overview, additional details are now provided regarding the query module 116 and the data mining module 118.

Starting with the data mining module 118, this module 118 includes a query-result logging module 126 (referred to for brevity as a logging module 126). The logging module 126 stores, in a query transaction log 128, information regarding the query-related behavior of a user. The query-related behavior generally describes any action taken by the user upon receiving search results. The search results, in turn, are generated by the query module 116 in response to a query entered by the user.

The logging module 126 can record various actions taken by a user, such as, but not limited to, the actions of: purchasing an item; pre-ordering an item; adding an item to a shopping cart; merely clicking on an item to discover more information about an item, and so forth. The logging module 126 can apply one or more rules to help determine if there is a significant nexus between a user's receipt of search results and an action that a user may subsequently take. One criterion that has a bearing on the significance of an action is whether the user clicked on a hypertext link that is expressly included in the search results, or whether the user otherwise performed some action with respect to an item that is expressly identified in the search results. Another criterion is whether the user's action is relatively close in time to the receipt of the search results. Still other criteria can be used to help discriminate meaningful actions from potentially irrelevant actions. For example, the user may have received search results pertaining to a music-related query. Soon thereafter, the user may have purchased an article of clothing, for whatever idiosyncratic reason. The logging module 126 can remove this action from consideration, because this action (purchasing an article of clothing) is presumably entirely unrelated to the receipt of search results pertaining to music. However, if the logging module 126 determines that this same behavior is shared by many users, it may optionally identify this behavior as a meaningful event.

The logging module 126 can store information regarding the users' query-related behavior in the query translation log 128 on a query-by-query basis. For example, the query translation log 128 can include an entry for each query that the users have entered. In association with this query, the query transaction log 128 can store information that describes the query-related behavior of the users (at it pertains the users' reaction to search results generated in response to the input of this query). The query-related behavior can identify the actions taken by the users, the times at which the users made the actions, and so forth. The logging module 126 can also record the results of aggregative analysis, that is, by storing information in the query transaction log 128 that indicates how many times users have performed common actions.

The data mining module 118 also includes a classification determination module 130. The purpose of the classification determination module 130 is to examine the information stored in the query transaction log 128 and to extract patterns from this log 128. The classification determination module 130 can perform this analysis on a periodic basis, such as once a day, once a week, and so on. Or the classification determination module 130 can perform this analysis in response to other kinds of triggering events, such as an indication that a predetermined amount of new behavioral information has been collected for one or more queries. The classification determination module 130 stores the output of its analysis in the query classification table 124.

The classification determination module 130 can perform its analysis on a query-by-query basis. Namely, for each query in the query transaction log 128, the classification determination module 130 can examine the actions that have been logged to determine whether these actions exhibit a pattern. If present, the pattern may reflect the mindset or intent of most of the users when entering that query. For example, the classification determination module 130 can detect a possible title-based intent upon noting that most of the users who entered the query "crying" responded to the search results by purchasing or otherwise selecting items that contained the word "crying" in their titles. Stated from another perspective, the classification determination module 130 may note that relatively few users made selections that reflect a thematic interest in the topic of "crying." In contrast, the classification determination module 130 can detect a possible theme-based intent upon noting that most of the users who entered the query "country music" responded to the search results by purchasing a variety of music by different artists, generally falling into the subject of country music. Stated from another perspective, the classification determination module 130 may note that relatively few users made selections that reflect an attempt to finds items having "country music" in their titles.

Accordingly, as a general mode of operation, the classification determination module 130 can perform classification by analyzing the relative distribution of post-query actions to determine whether these actions conform to a telltale pattern (or plural patterns). The classification determination module 130 can perform this operation by making reference to a store of rules. To facilitate detection of these patterns, the classification module 130 can optionally rely on various statistical tools, such as cluster analysis, pattern recognition analysis, and so forth. The classification determination module 130 can also rely on various confidence metrics to determine whether a pattern has been detected with a sufficient degree of confidence (e.g., using Bayesian analysis, or any other statistical technique or combination of techniques).

The classification determination module 130 can optionally also consider other kinds of information besides user actions. For example, the classification determination module 130 can consider the time at which actions occurred in performing its analysis. For instance, the classification determination module 130 can apply weighting factors which attach greater significance to recent user behavior (compared to less recent behavior). In one particular implementation, the classification module 130 can use a sliding time window to accept only a prescribed time interval of behavior in performing its analysis. In another implementation, the classification module 130 can apply any kind of downward slopping weighting function (linear, exponential, etc.) to reduce the relevance of behavior as a function of past time. In more advanced cases, the classification determination module 130 can also apply temporal considerations to detect seasonal variations in intent. For instance, the classification determination module 130 can determine that users tend to use the query "ornament" in the month of December to locate an item that describes a Christmas tree ornament item, this item having the word "ornament" in the title. But at other times of the year, the classification determination module 130 may determine that the query "ornament" predominately refers to a theme-based search for jewelry, such as broaches, etc.

In yet another optional implementation, the classification module 130 can also perform its analysis on a user-by-user basis, a region-by-region basis, and on so. To enable this implementation, the query transaction log 128 can also store information which identifies the users who performed the actions that have been recorded. User information can be detected in conventional fashion, e.g., by requiring the users to enter identifying information (Email addresses, passwords, etc.) prior to making purchases, etc. By forming user-specific classifications, the query module 116 can potentially present more relevant results to a user who has idiosyncratic search habits. For instance, a particular user may always purchase a particular type of jeans when she enters the query "hip hugger." Accordingly, for this particular user, the classification determination module 130 can classify this query as a brand-specific query, whereas, for other users, the classification determination module 130 can classify this query as a general theme-based query.

In more general terms, FIG. 1 shows that the classification determination module 130 can rely on one or more supplemental data stores 132 in performing its analysis. The data stores 132 provide any supplemental information that can be used to help classify the behavior of users. The data stores 132 may include user profile information, region-specific information, and so forth.

The classification determination module 130 can store the results of its analysis in the query classification table 124 in various formats. In one case, the classification determination module 130 can store a list of queries that have been entered. The classification determination module 130 can then store information regarding the intent-based classification of each query. For example, the classification determination module 130 can pair the query "country music" with the classification "theme-based query," the query "crying" with the classification "title-based query," and so on. Alternatively, or in addition, the classification determination module 130 can include information which more directly identifies the result-generating functions to be used to process the respective queries when they are encountered again.

In one illustrative implementation, the classification determination module 130 does not store every query entered by users. Rather, the classification determination module 130 can filter the queries entered by users to store only popular queries, or queries for which tell-tale patterns have been detected, and so on.

It will be appreciated that the classifications in the query classification table 124 may dynamically vary over time. Consider the case in which users begin entering a new query, e.g., corresponding to a new product being offered by a merchant. The classification determination module 130 may initially make a default assumption about this query, e.g., that it reflects a title-based type of search. But as further behavior data is collected, it may become evident that the query actually reflects a theme-based type of search. Upon reaching this conclusion, the classification determination module 130 can then re-designate this query as a theme-based search. In another case, the classification determination module 130 may find that even a stable use of a certain query can change over time. In response, the module 130 can change its classification to track shifting trends in intent.

In another illustrative implementation, the system 100 shown in FIG. 1 can administer separate component systems for selling items. These separate systems can be thought of as separate marketplaces, which may be associated with separate respective websites. In this environment, the classification determination module 130 can perform separate classification-related analysis for the different marketplaces. Correspondingly, the query classification table 124 can log separate classifications for separate marketplaces. For example, hypothetically, when the user enters the query "mouse" in a marketplace dedicated to selling electronic goods, the user may be, more often than not, performing a theme-based search for a graphical input device. When the user enters this same query in a marketplace dedicated to selling books, the user may be, more often than not, performing a title-based search.

A.4. Illustrative Query Module Component

Now turning attention to the query module 116, this module 116 can interact with a user interaction module 134, which may be separate from the query module 116 or a part of the query module 116. The user interaction module 134 can comprise front-end functionality that serves web pages to the user. In particular, the user interaction module 134 can serve one or more user interface presentations that allow a user to enter one or more queries. The user interaction module 134 can also provide one or more user interface presentations that present search results to the users. The user device 102 can display these presentations on its presentation unit 110.

The query module 116 also includes a function selection module 136 (referred to for brevity as a function selection module 136). The function selection module 136 determines whether the data mining module 118 has identified an intent category corresponding to a particular query entered by a user. The function selection module 136 can perform this role by using the entered query as an index to search through the query classification table 124. If the query classification table 124 includes the entered query, the function selection module 136 reads the classification information that the table 124 has associated with the query. For instance, the classification may indicate that the query is a "title-based query," "theme-based query," and so on. Alternatively, as stated, the query classification table 124 can more directly identify a particular result-generating function that should be applied to the entered query.

If the function selection module 136 cannot find the entered query in the query classification table 124, the query module 116 can apply a default result-generating function to process the entered query. In one implementation, the function selection module 136 demands an exact correspondence between the entered query and a corresponding entry in the query classification table 124 in order to indicate a match.

In another implementation, the function selection module 136 can permit more relaxed matching between the entered query and the queries set forth in the query classification table 124. For instance, the function selection module 136 can expand the conditions for a match to include synonyms of the entered queries, and so forth.

In another relaxed matching implementation, consider the case in which the user's input query includes two or more component key terms. For example, the user may enter the query "Cajun country music," which includes three key words, "Cajun," "country," and "music." The classification determination module 130 can optionally, as part of its back-end processing, identify classification results for individual key words. For example, the classification determination module 130 can analyze instances in which users have entered the key term "Cajun" by itself (in which case the word Cajun constitutes the entire query), as well as instances in which users have entered the key term "Cajun" in combination with one or more other key words. Based on this analysis, the classification determination module 130 can form the conclusion that, when users enter the key term Cajun in conjunction with some other key term, they are, more often than not, performing a theme-based search. Next assume that the function selection module 136 determines that there is no exact matching query in the classification table 124 for the complete query "Cajun country music." In this case, rather than defaulting to a general purpose result-generating function, the function selection module 136 can adopt the classification status assigned to "Cajun" or "country music."

Upon detecting an applicable classification in the query classification table 124, the function selection module 136 can use this classification to select one or more of the result-generation functions 122. In general, the suite of result-generating functions 122 can include two or more result-generating functions. FIG. 1 shows that the result-generating functions 122 include a result-generating function A 138, result-generating function B 140, result-generating function n 142, and so on. As explained above, the result-generation modules 122 are responsible for generating query results based on different paradigms. For example, a first result-generating paradigm can rank query results so that title-based matching entries are favored. This is therefore an appropriate function for a title-based intent classification. A second result-generating paradigm can rank query results so that theme-based matching entries are favored. This is therefore an appropriate function for a theme-based intent classification. One of the result-generating functions 122 can serve as a default function, meaning that it is called upon as a default when the query classification table 124 does not provide definitive results for an entered query.

The selected result-generating function is then invoked to generate output results according to a particular intent-based paradigm. The user interaction module 134 supplies the output of the selected result-generating function to the user for his or her consideration.

Figure 2:
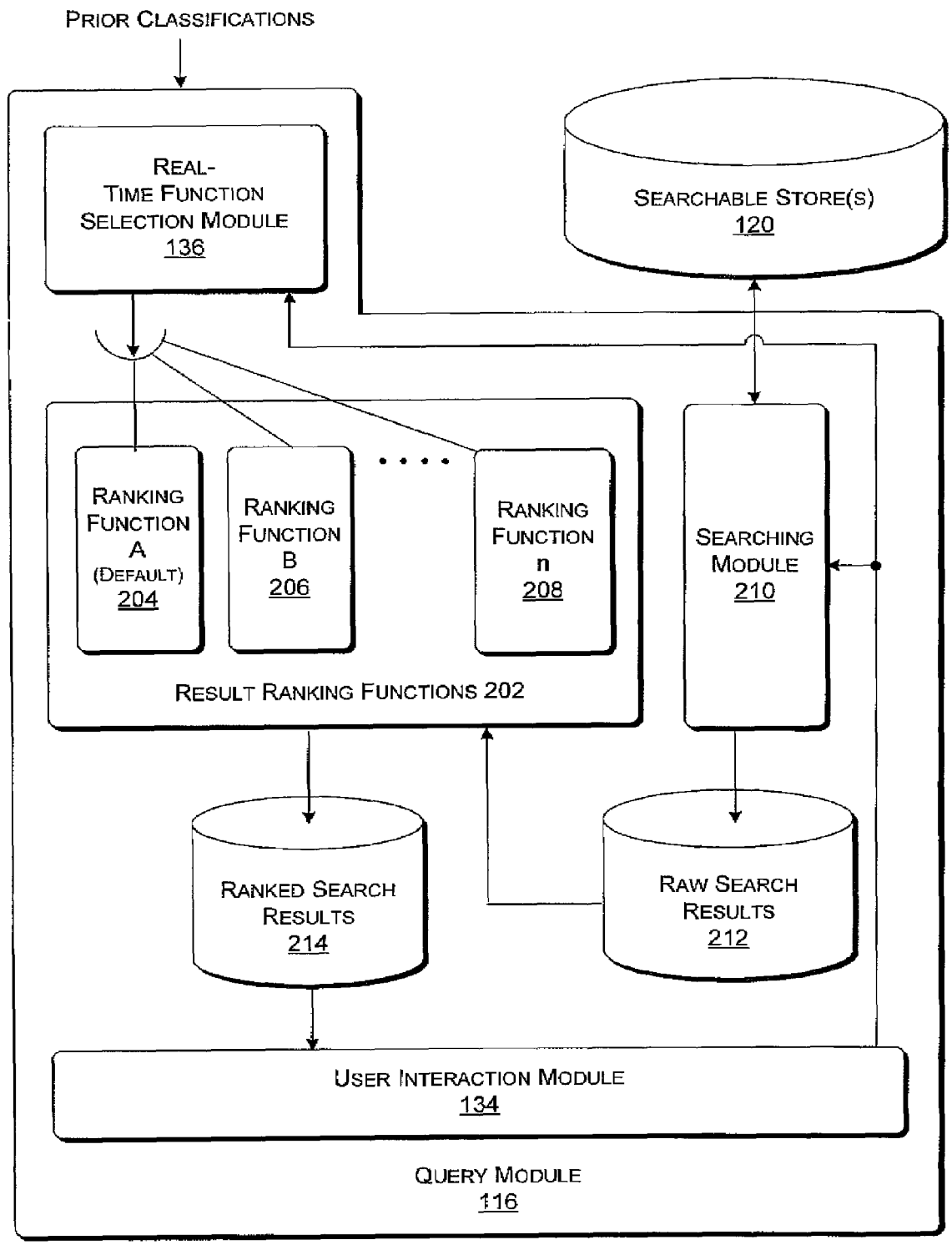
FIG. 2 shows one illustrative query module that can be used in the system of FIG. 1.

FIG. 2 shows additional detail regarding one illustrative implementation of the query module 116. In this implementation, the query module 116 includes a suite of ranking functions 202, including representative ranking functions 204, 206, and 208. The purpose of each ranking function (204, 206, . . . 208) is to rank search results based on a particular ranking paradigm.

The query module 116 also includes a searching module 210. The purpose of the searching module 210 is to search the searchable store 120, based on a query entered by the user. The searching module 210 stores items that match the query in a raw search result store 212. In one illustrative case, the search module 210 can use the well known inverted index approach to identify matching results.

The function selection module 136 operates as stated above, that is, by selecting one of the ranking functions based on information imparted by the query classification table 124. The selected ranking function is then invoked to rank the search results in the raw search result store 212 according to a particular ranking paradigm. The selected ranking function can then store ranked results in a ranked result store 214. The user interaction module 134 then provides the ranked results to the user.

Other implementations can vary the approach shown in FIG. 2 in one or more respects. For example, another approach can employ a suite of search modules, rather than post-search ranking modules. The search modules can apply different ranking paradigms, as in the case described above in FIG. 2. In addition, the search modules can optionally apply different approaches in deciding what information to extract from the searchable store 120 (in other words, the search modules can apply different paradigms in deciding what entries in the searchable store 120 constitute matches).

As a final topic regarding the components of FIG. 1, note that the operations of the system 100 were described as being performed primarily by the components of the operations center 104. However, it should be noted that one or more functions described above as being implemented by the operations center 104 can alternatively, or in addition, be performed on a local level by the devices, such as by device 102. To generically represent this feature, FIG. 1 shows that the device 102 includes optional searching functionality 144. For instance, instead of, or in addition to, the use of the operations center 104 to perform data mining, the system 100 can rely on de-centralized peer-to-peer interaction to collect information regarding certain trends in the query-related behavior of a population of users.

A.5. Illustrative Application of the System

Figure 3:
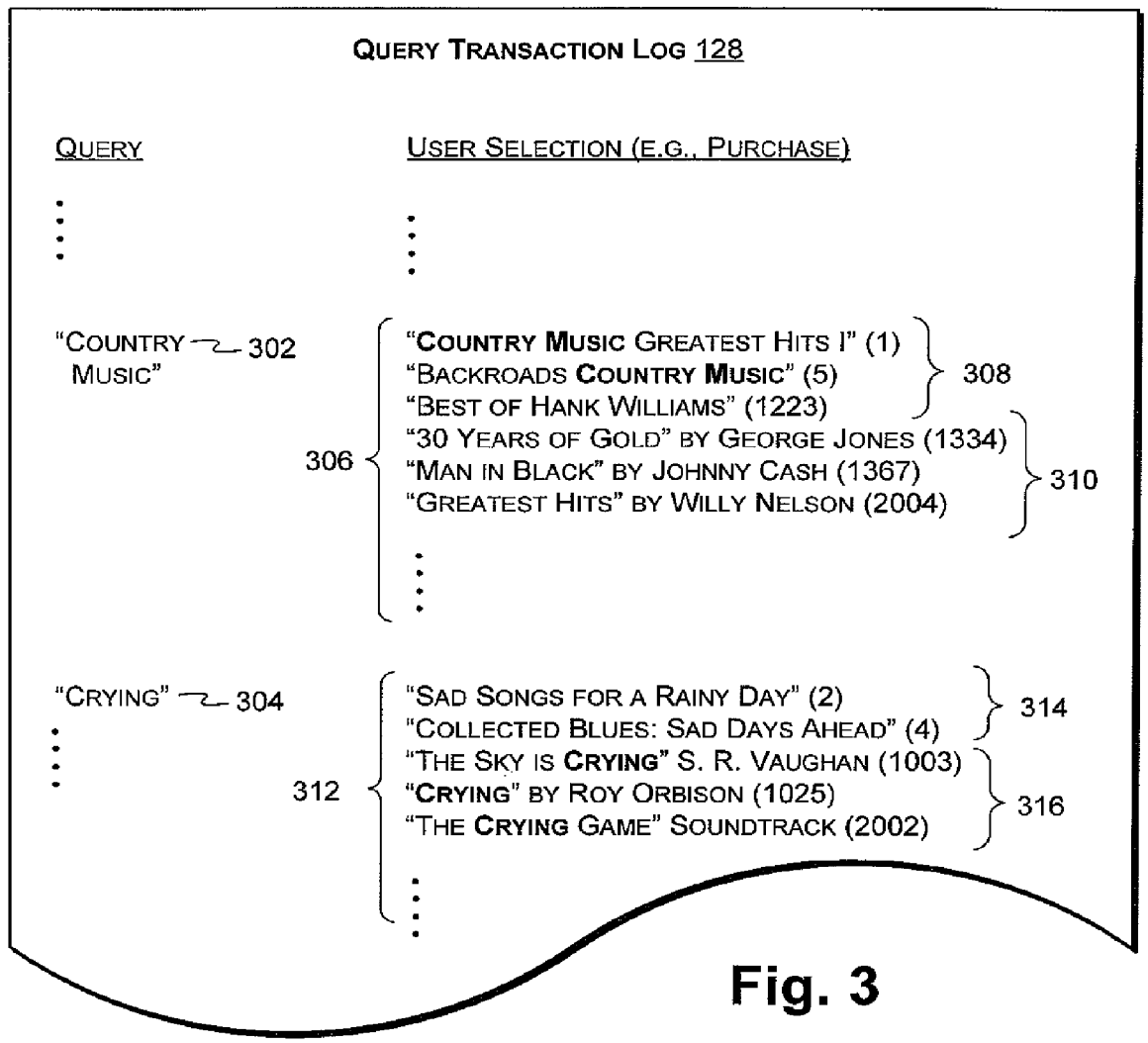
FIG. 3 shows an illustrative query transaction log maintained by a data mining module of the system of FIG. 1.
Figure 4:
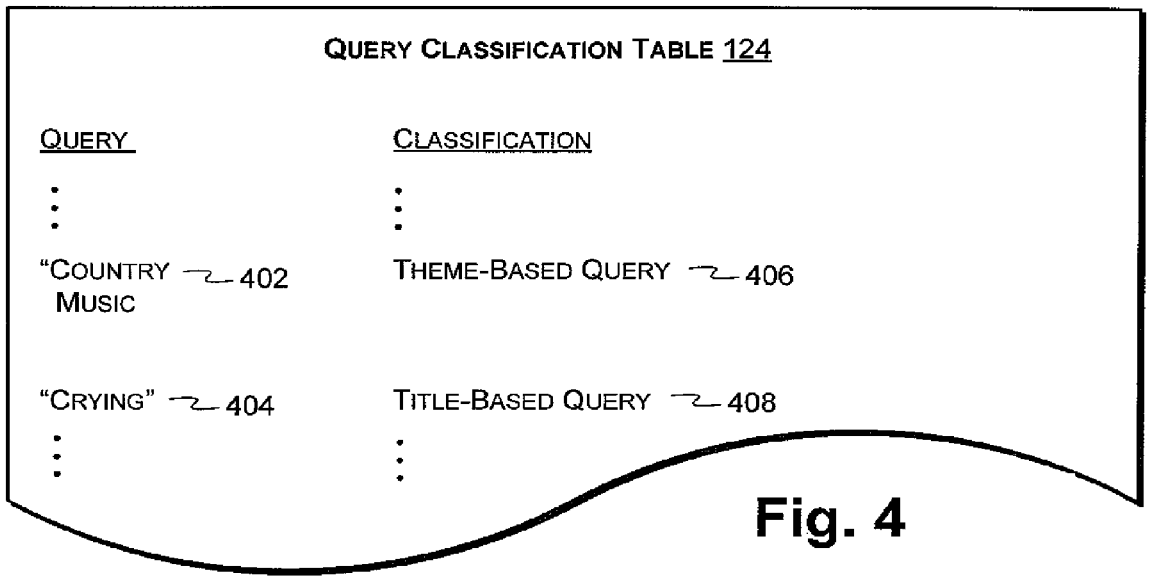
FIG. 4 shows an illustrative query classification table maintained by the data mining module of the system of FIG. 1.
Figure 5:
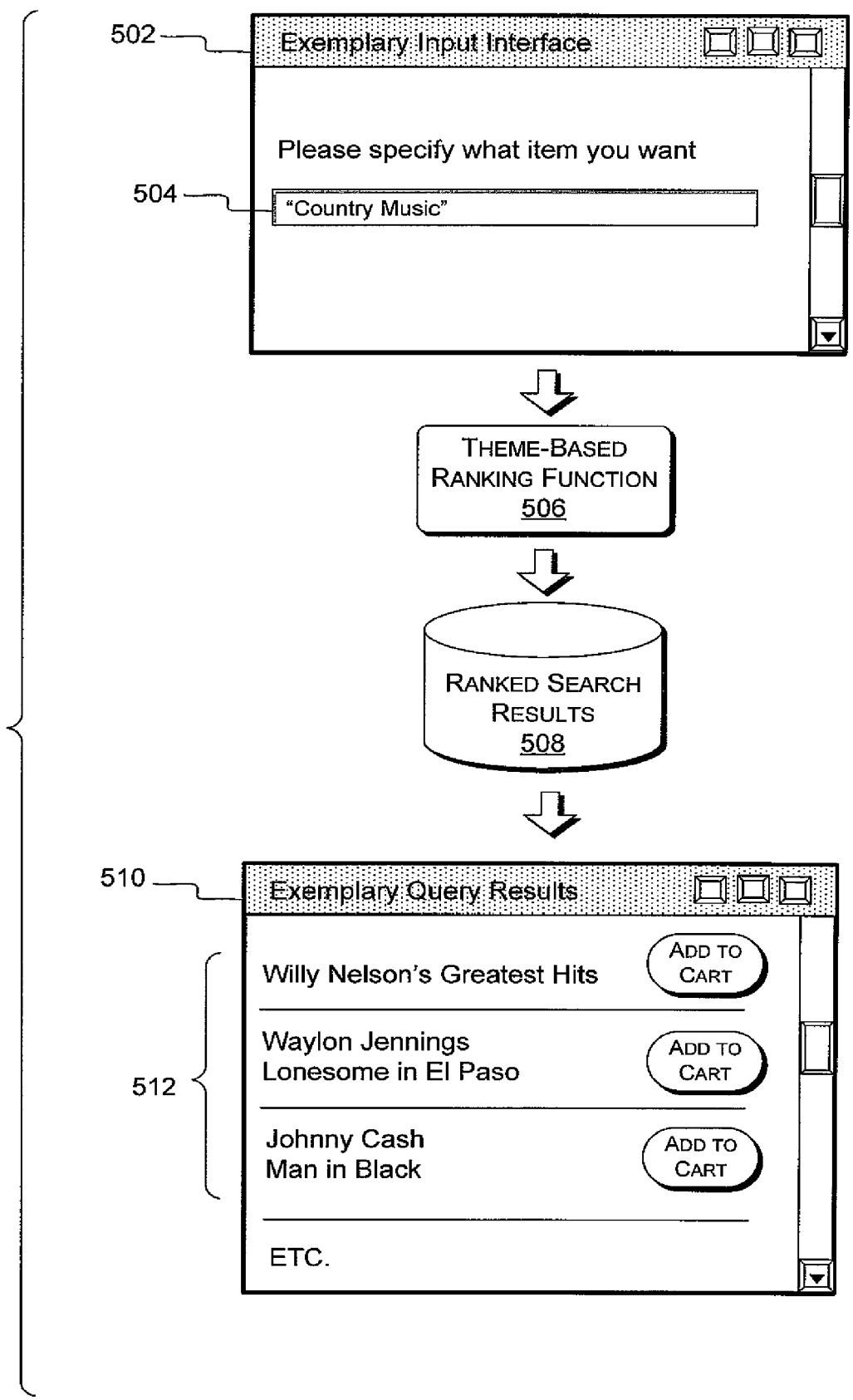
FIG. 5 shows an illustrative sequence of user interface presentations that may be generated by the system of FIG. 1.

FIGS. 3-5 expand on the example scenario introduced above. Recall that, in this example, a search query "country music" reflects the intent by users to investigate the subject of country music items. The search item "crying," on the other hand, reflects the intent of users to find items that have the word "crying" in their titles. To accommodate these two classifications, the query module 116 includes a first result-generating function that is tailored to appropriately process theme-based queries, and a second result-generating function that is tailored to appropriately process title-based queries.

FIG. 3 shows a simplified structure of the query transaction log 128. Among other entries (not shown), the query transaction log 128 includes the query "country music" 302 and the query "crying" 304. The query transaction log 128 also includes information regarding the users' query-related behavior. In this illustrative case, the query transaction log 128 identifies items that the users have purchased, although the query transaction log 128 can record other kinds of selections made by users.

In the particular case of FIG. 3, the query transaction log 128 includes a collection 306 of item purchases, where such purchases have a causal link to the entry of the query "country music" 302. Note that this list of items 306 may include one or more items 308 that feature the query "country music" in their titles. The list of items 306 may also include one or more items 310 that have only a thematic relation to the query country music. Namely, this subset of items 310 reflects the fact that users have purchased items that feature popular country music artists, although these items may not necessarily include the query "country music" in their titles.

The query transaction log 128 includes another collection 312 of item purchases, where such purchases have a causal link to the entry of the query "crying" 302. Note that this list of items 312 may include one or more items 314 that have a thematic relation to the query "crying," e.g., which identify a sadness-related theme, etc. The list of items 312 may also include one or more items 316 that actually have the query "crying" in their respective titles.

Each item in the list of items 306 includes a number in parentheses. This number indicates a quantity of items that have been purchased by a population of users in response to the input of the query "country music." Note that relatively few users have purchased items that have "country music" in the titles, while many more users have purchased items by artists relating to the subject of country music. Further note that the users are not primarily interested in any one country music artist, but the result items generally span the gamut of well known country music artists. Now turning to the list of items 312 associated with the query "crying," note that relatively few users have purchased items that feature "crying" as a thematic topic, while many more users have purchased items that actually include the word "crying" in their titles.

The classification determination module 130 processes the information in the query transaction log 128 to produce the query classification table 124. FIG. 4 shows a sample of the query classification table 124. This table identifies, among other entries (not shown), the queries of "country music" 402 and "crying" 404. The query classification table 124 associates the query "country music" 402 with the classification of "theme-based query" 406 and associates the query "crying" 404 with the classification of "title-based query" 408. As stated above, the query classification module 124 can alternatively provide more direct guidance as to what result-generating functions should be used to process the queries, such as by providing unique codes which reference the functions.

FIG. 5 illustrates the operation of the system 100 from the perspective of a user. Namely, the user interaction module 134 of the query module 116, in potential cooperation with client-side browser functionality, can present a user interface presentation 502. This presentation 502 invites the user to enter a query (e.g., via input box 504). In this example, the user has entered the query "country music."

As this point, the function selection module 136 determines, based on its consultation with the query classification table 124, that the query "country music" likely reflects the user's intent to perform a theme-based search. The function selection module 136 therefore invokes a theme-based ranking function 506. The theme-based ranking function 506 applies a ranking paradigm that is specifically tailored to favor theme-based result items. The theme-based ranking function 506 produces a set of ranked search results 508.

The user interaction module 134 presents the ranked search results 508 in another user interface presentation 510. The user interface presentation 510 provides a list 512 of the ranked search result items in the order in which they have been ranked. The ranked search results give priority to theme-based search result items, e.g., by displaying these items first in the list 512. Note, for instance, that the top of the list 512 is not cluttered by items that have the query "country music" in their titles. This is because there is a low probability (based on the analysis performed by the classification determination module 130) that the user is actually looking for items that have the query "country music" in their titles.

A.6. Illustrative Processing Functionality

FIG. 6 shows illustrative processing functionality 600 that can be used to implement various aspects of the system 100 shown in FIG. 1, such as the user device 102, the operations center 104, any component of the operations center 104, and so forth. The processing functionality 600 can represent, without limitation, any one or more of: a personal computer; a laptop computer; a server-type computer; a book-reader type device; a portable media player device; a personal digital assistant (PDA) device; a mobile telephone device; a tablet-type input device; any kind of wearable device; a game console device; a set-top box device, and so on. To facilitate discussion, the processing functionality 600 is described below as specifically implementing the representative user device 102, although, as stated, the generic processing functionality 600 also sets forth an architecture of a server-type computer that can be deployed at the operations center 104.

In this local device context, the processing unit 108 can comprise one or more processing components 602 (such as a CPU, neural network, etc.), RAM 604, RAM 606, media components 608 (such as a hard drive, DVD drive, etc.), network interface 610 (such as a telephone or cable modem, broadband connectivity mechanism, etc.), and an I/O interface 612 for interacting with input devices and output devices. One or more buses 614 couple the above-described components together.

The output device(s) can include the presentation unit 110, which presents the graphical user interface 114. The input device(s) 112 can include any one or more of a keyboard, mouse input device, track ball input device, joystick input device, touch sensitive screen, and so forth.

In any application of the processing functionality 600, various functions can be implemented as machine-readable instructions that reside in any storage unit or combination of storage units shown in FIG. 6, and the processor 602 can execute these instructions to produce desired data mining and/or search-related operations.

B. Illustrative Procedures

Figure 7:
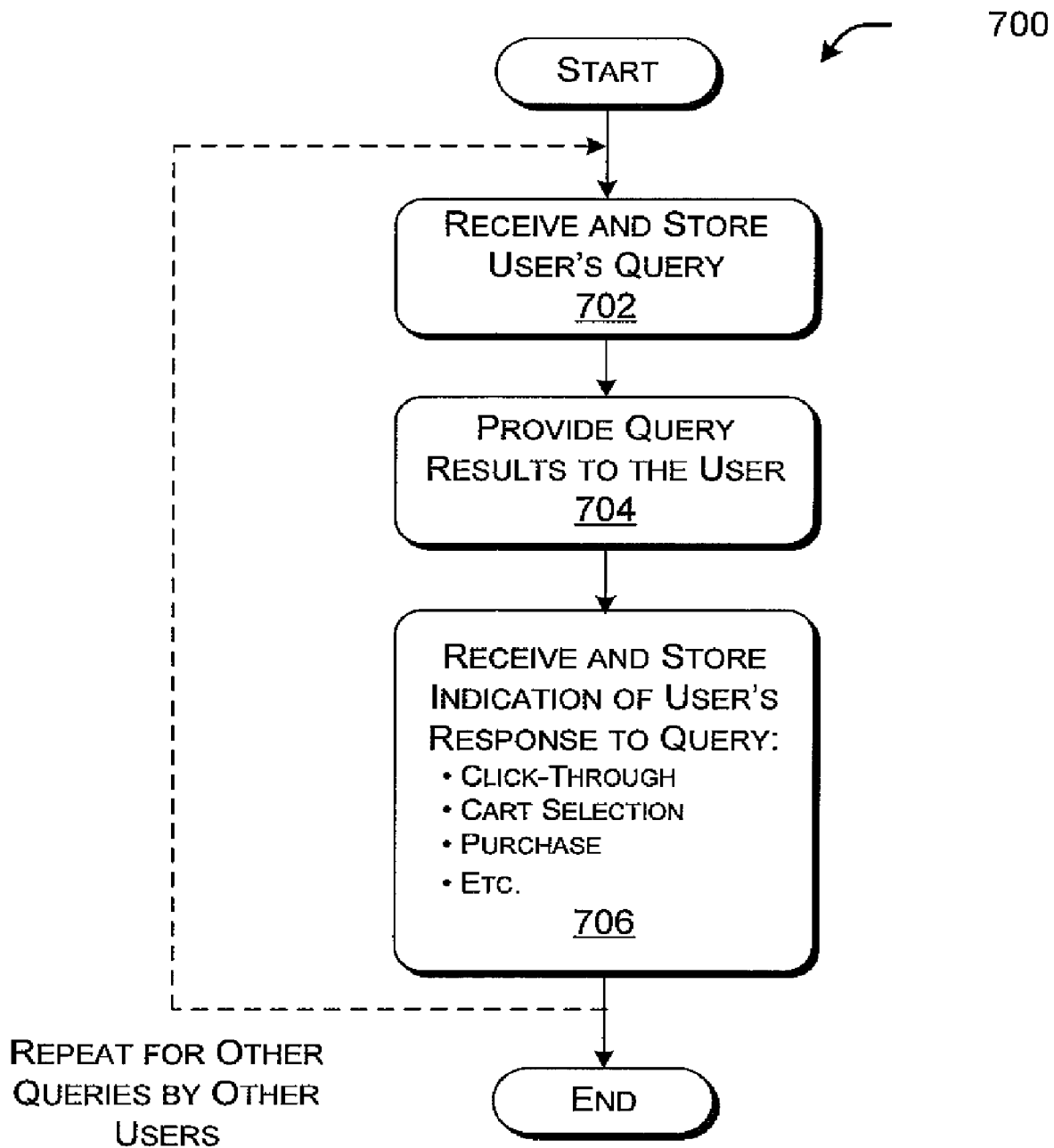
FIG. 7 shows an illustrative procedure for collecting query-related behavior from the user.
Figure 8:
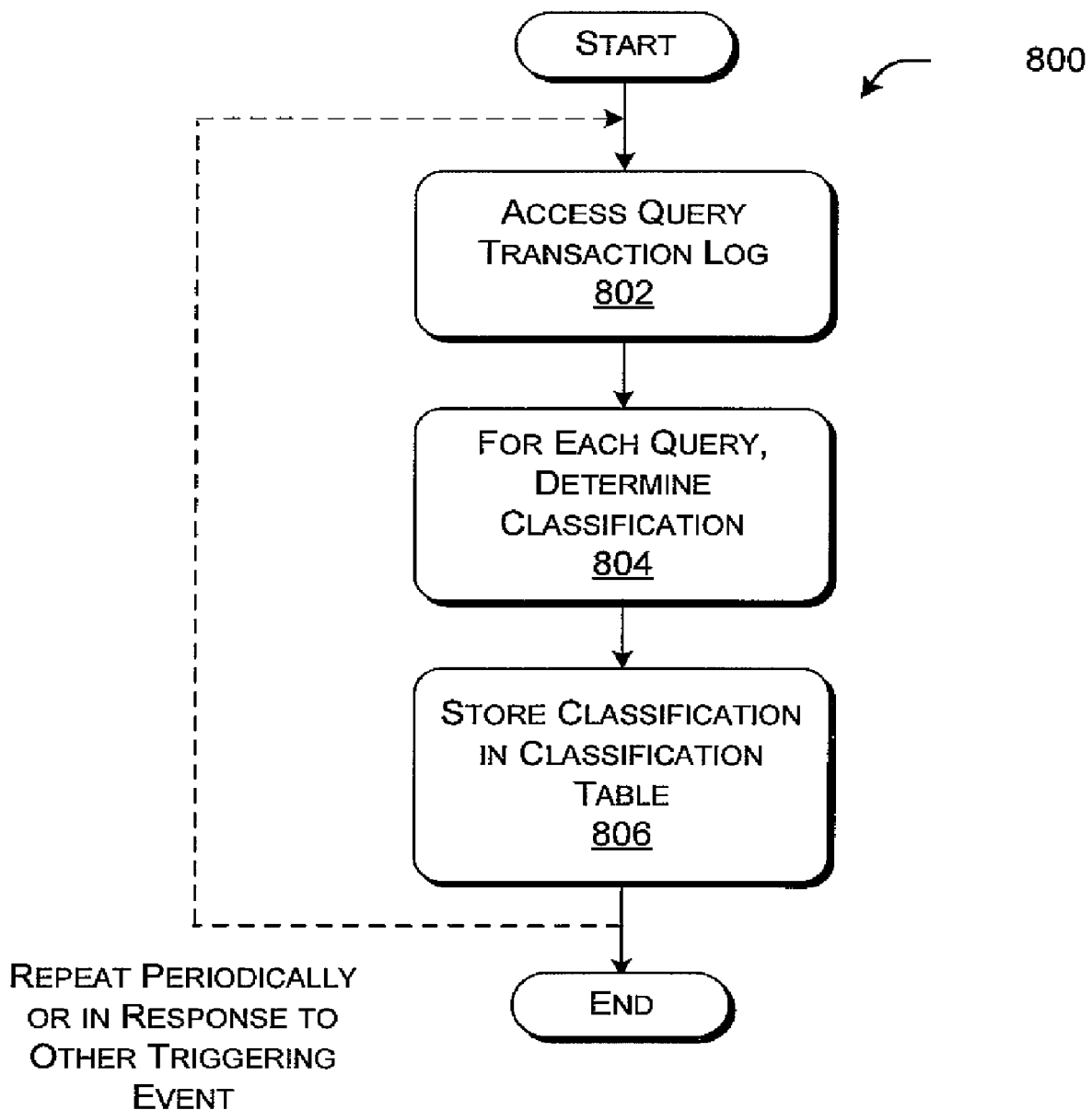
FIG. 8 shows an illustrative procedure for forming a classification table based on the query-related behavior collected in the procedure of FIG. 7.
Figure 9:
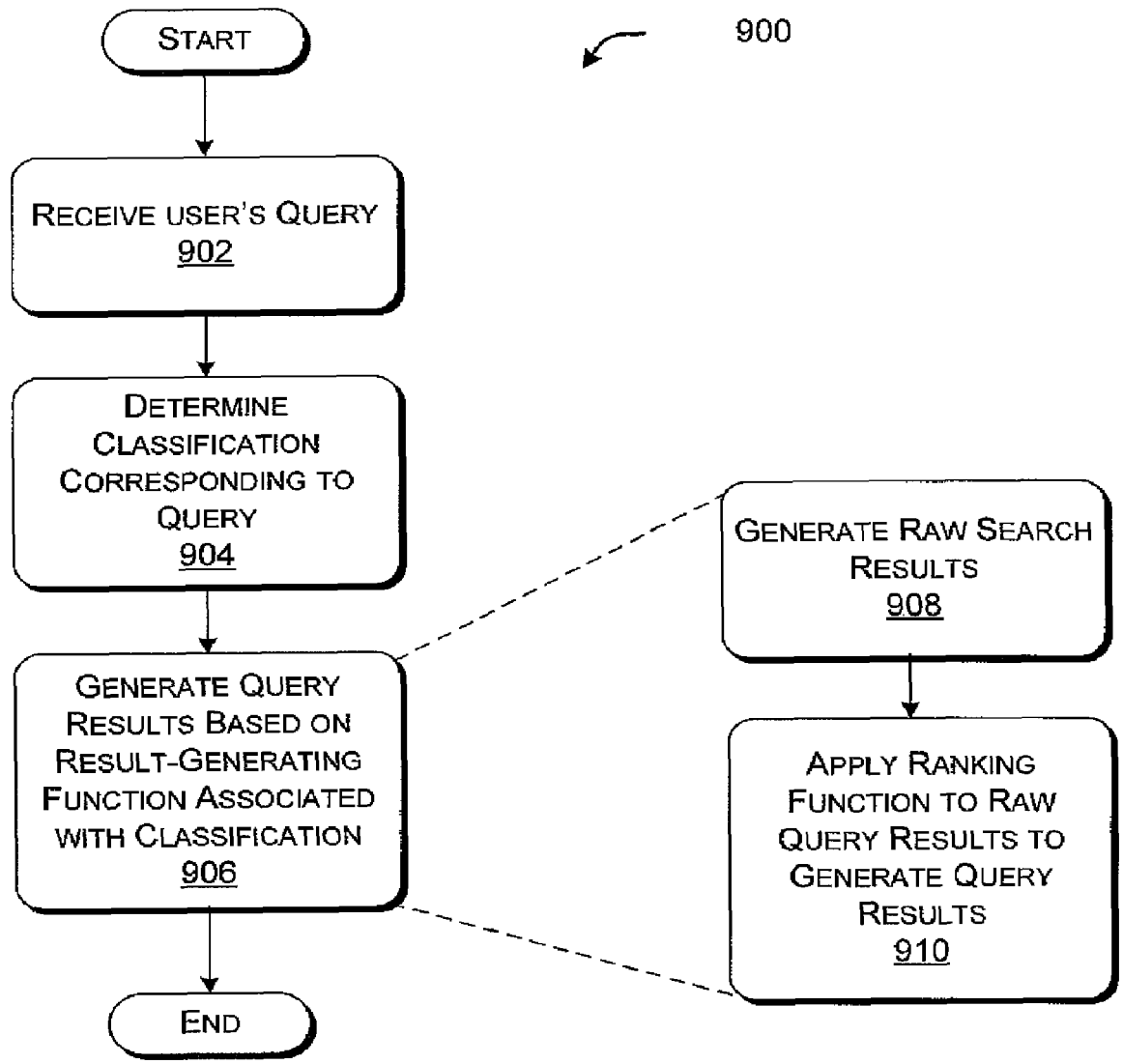
FIG. 9 shows an illustrative procedure for responding to a particular query made by an individual user, based on the classification table formed in the procedure of FIG. 8.

FIGS. 7-9 describe the operation of the system 100 of FIG. 1 in flow chart form. To facilitate discussion, certain operations are described as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, or by a combination of these elements.

As the functions described in the flowcharts have already been set forth in Section A, Section B serves primarily as a review of those functions.

B.1. Logging Query-Related Behavior

FIG. 7 shows an illustrative procedure 700 for collecting query-related behavior from a population of users who have interacted with the system 100. The procedure 700 specifically describes operations that are performed in response to a user's input of a single query. The loop depicted with a dashed line indicates that this procedure 700 can be repeated each time any user enters a query.

In block 702, the logging module 126 detects that a user has entered a query. The logging module 126 can detect the input of a query in response to being notified of such event by the query module 116. In response to detecting the query, the logging module 126 stores the query in the query transaction log 128.

In block 704, the query module 106 responds to the user's query by searching the store 120 and providing a list containing one or more matching results. The query module 106 can apply a selected query-generating function to perform this task, or a default query-generating function.

In bock 706, the logging module 126 again comes into play by detecting the user's response to the results generated in block 704. For instance, the user can make any number of selections after receiving query results, including clicking on one or more of the items in the results, adding one or more of the items to a shopping cart, purchasing one or more of the items, and so on. The logging module 126 stores the user's action in the query transaction log 128, linking this behavior to the appropriate query in the transaction log 128. The logging module 126 can also store information regarding the time at which an action occurred, the identity of the user who performed the action, and so on.

B.2. Analyzing Query-related Behavior of Users

FIG. 8 shows a procedure 800 for analyzing the information in the query transaction log 128 to classify the probable intent of the users in entering the queries.

In block 802, the classification determination module 130 accesses the query transaction log 128. It can perform this task on a periodic basis or in response to any other triggering event.

In block 804, the classification determination module 130 determines a classification for each query identified in the query transaction log 128. Or the classification determination module 130 can selectively determine classifications for only popular queries identified in the transaction log 128.

In block 806, the classification determination module 130 stores the results of its classification in the query classification table 124.

B.3 Applying Predetermined Classifications to Generate Results for an Individual Query.

Finally, FIG. 9 shows a procedure 900 for processing a particular query entered by an individual user, leveraging the insight gained by the data mining module 118 (in procedure 800 of FIG. 8).

In block 902, the user interaction module 134 of the query module 116 receives the user's query.

In block 904, the function selection module 136 accesses the query classification table 124 to determine whether the entered query is associated with a predetermined intent classification. If so, the function selection module 136 invokes a corresponding result-generating function which is specifically designed to provide query results for the identified intent classification.

In block 906, the selected result-generating function generates a ranked list of output results for presentation to the user via the user interaction module 134.

Blocks 908 and 910 describe one illustrative way of performing the general operation of block 906. In block 908, the searching module 210 (of FIG. 2) generates raw search results. In block 910, a selected ranking function operates on these raw search results to order them in accordance with a specifically tailored ranking paradigm.

In closing, a number of features were described herein by first identifying illustrative problems that these features can address. This manner of explication does not constitute an admission that others have appreciated and/or articulated the problems in the manner specified herein. Appreciation and articulation of the problems present in the relevant art(s) is to be understood as part of the present invention. Further, the identification of one or more problems herein does not suggest that the invention is restricted to solving only those problems. In other words, the invention may address additional needs that are not expressly identified herein.

More generally, although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

What is claimed is:

1. A computerized method for providing query results based at least in part on user intent, comprising:
   receiving, at a computing device, a query from each of a plurality of users, each query of queries received from the plurality of users being a same query;
   generating and providing query results to each user of the plurality of users at least in part in response to the receiving of the query;
   identifying actions taken by said each user of the plurality of users upon receiving the query results to determine query-related behavior of the plurality of users after submitting the query by identifying patterns in the actions that evince a predominant intent of the users in entering the queries;
   associating a result-generating function with the query based at least in part on the determined query-related behavior of the plurality of users after submitting the query;
   receiving the query from an individual user, the query received from the individual user being the same query previously submitted by said each user of the plurality of users;
   identifying, at least in part in response to the receiving of the query from the individual user and using classification mapping information, the result-generating function associated with the query, wherein the classification mapping information maps queries into different result-generating functions based on an analysis of prior query-related behavior of a plurality of users; and
   generating query results for the individual user using the identified result-generating function that is based at least in part on the determined query-related behavior of the plurality of users that have submitted the query.

2. The computerized method of claim 1, wherein the actions comprise at least one purchase of an item.

3. The computerized method of claim 1, wherein the actions comprise at least one instruction to add an item to a shopping cart.

4. The computerized method of claim 1, wherein the actions comprise at least one click-through event in which a user clicks on an item.

5. The computerized method of claim 1, wherein the analysis of the prior query-related behavior comprises:
   associating result-generating functions with the identified patterns to provide classification results; and
   creating the classification mapping information based on the classification results.

6. The computerized method of claim 1, wherein the analysis of the prior query-related behavior operates by weighting the query-related behavior based on time.

7. The computerized method of claim 1, wherein the result-generating functions provide different respective strategies for ranking query results.

8. The computerized method of claim 1, wherein the plurality of result-generating functions are associated with different respective classifications.

9. The computerized method of claim 8, wherein at least one classification indicates that a query is predominately used to identify a title of a desired item.

10. The computerized method of claim 8, wherein at least one classification indicates that a query is predominately used to identify a theme of a desired item.

11. The computerized method of claim 8, wherein at least one classification indicates that a query is predominately used to identify a desired item having a defined brand.

12. The computerized method of claim 8, wherein at least one classification indicates that a query is predominately used to identify a desired item having a defined temporal status.

13. The computerized method of claim 8, wherein at least one of the result-generating functions is used as a default if a classification of the individual user's query cannot be determined.

14. The computerized method of claim 8, further comprising determining a classification corresponding to the user's query based on the entirety of the query.

15. The computerized method of claim 8, comprising determining a classification corresponding to the user's query based on at least one key term in the user's query, in the event that classification cannot be performed based on the entirety of the query.

16. The computerized method of claim 1, further comprising:
   receiving another query from another user, the another query being substantially similar to the same query;
   generating and providing query results to the another user at least in part in response to the receiving of the another query; and
   identifying actions taken by the another user upon receiving the query results to determine query-related behavior of the another user after submitting the another query; and wherein the result-generating function associated with the same query is also based at least in part on the determined query-related behavior of the another user after submitting the another query.

17. The computerized method of claim 16, wherein the result-generating function associated with the same query is also associated with the another query that is substantially similar to the same query.

18. The computerized method of claim 17, further comprising:
   receiving the another query that is substantially similar to the same query from a user;
   identifying, at least in part in response to the receiving of the another query from the user, the result-generating function; and
   generating query results for the user that submitted the another query using the identified result-generating function.

19. An apparatus for providing query results based at least in part on user intent, comprising:
   one or more processors;
   memory;
   a data mining module, stored in the memory and executable on the one or processors to:
      collect information regarding behavior of a plurality of users after each user of the plurality of users has submitted a same query; and
      based at least in part on the collected information, identify a pattern of behavior of the plurality of users after each of the plurality of users has submitted the same query, the pattern of behavior evincing a predominant intent of the plurality of users submitting the same query; and a query module, stored in the memory and executable on the one or processors to:
receive the same query from a subsequent user that is different from the plurality of users after the collecting of the information and after the identifying of the pattern of behavior; and
generate search results for the subsequent user at least in part in response to the receiving of the same query from the subsequent user, wherein the search results generated for the subsequent user are tailored to a probable intent of the subsequent user submitting the same query, and wherein the probable intent of the subsequent user is determined based at least in part on the pattern of behavior of the plurality of users that have previously submitted the same query.

20. The apparatus of claim 19, wherein the pattern of behavior indicates that the same query is predominately used to identify a title of a desired item.

21. The apparatus of claim 19, wherein the pattern of behavior indicates that the same query is predominately used to identify a theme of a desired item.

22. The apparatus of claim 19, wherein the pattern of behavior indicates that the same query is predominately used to identify a desired item having a defined brand.

23. The apparatus of claim 19, wherein the pattern of behavior indicates that the same query is predominately used to identify a desired item having a defined temporal status.

24. The apparatus of claim 19, wherein the data mining module is further operative to identify the behavior of the users by identifying actions that the users have taken upon receiving query results.

25. The apparatus of claim 19, wherein the data mining module is further operative to create classification mapping information that maps queries with patterns of behavior predominately associated with the queries.

26. The apparatus of claim 19, wherein the query module provides a plurality of result-generating functions, wherein the result-generating functions apply different respective strategies for producing search results.

27. The apparatus of claim 26, wherein the query module is operative to select one of the plurality of result-generating functions in response to an input of the same query, based at least in part on the pattern of behavior assessed by the data mining module.

28. The apparatus of claim 26, wherein the result-generating functions are operative to provide different respective strategies for ranking query results.

29. The apparatus of claim 28, wherein at least one of the result-generating functions is operative to generate results that give relative priority to result items that have a title-based affiliation with a query.

30. The apparatus of claim 28, wherein at least one of the result-generating functions is operative to generate results that give relative priority to result items that have a theme-based affiliation with a query.

31. A system comprising the apparatus of claim 19, the apparatus being communicatively coupled to a plurality of user devices via a digital network.

32. A computer-implemented method for providing query results based at least in part on user intent, the method comprising:
under control of one or more computer systems configured with executable instructions,
collecting information regarding behavior of a plurality of users after each user of the plurality of users has submitted a same query;
based at least in part on the collected information, identifying a pattern of behavior of the plurality of users after said each user of the plurality of users has submitted the same query, the pattern of behavior evincing a predominant intent of the plurality of users submitting the same query;
receiving the same query from a subsequent user that is different from the plurality of users after the collecting of the information and after the identifying of the pattern of behavior; and
generating search results for the subsequent user at least in part in response to the receiving of the same query from the subsequent user, wherein the search results generated for the subsequent user are tailored to a probable intent of the subsequent user submitting the same query, and wherein the probable intent of the subsequent user is determined based at least in part on the pattern of behavior of the plurality of users that Amended have previously submitted the same query.

33. A computerized method for providing query results based at least in part on user intent, comprising:
receiving, at a computing device, a query from each of a plurality of users, each query of queries received from the plurality of users being a same query;
generating and providing query results to each of the plurality of users at least in part in response to the receiving of the query;
identifying actions taken by each of the plurality of users upon receiving the query results to determine query-related behavior of the plurality of users after submitting the query;
associating a result-generating function with the query based at least in part on the determined query-related behavior of the plurality of users after submitting the query;
receiving the query from an individual user, the query received from the individual user being the same query previously submitted by each of the plurality of users;
identifying, at least in part in response to the receiving of the query from the individual user and using classification mapping information, the result-generating function associated with the query, wherein the classification mapping information maps queries into different result-generating functions based on an analysis of prior query-related behavior of a plurality of users; and
generating query results for the individual user using the identified result-generating function that is based at least in part on the determined query-related behavior of the plurality of users that have submitted the query;
wherein the analysis of the prior query-related behavior operates by weighting the query-related behavior based on time and wherein the analysis comprises:
identifying patterns in the actions that evince a predominant intent of the users in entering the queries;
associating result-generating functions with the identified patterns to provide classification results; and
creating the classification mapping information based on the classification results;
and wherein the different result-generating functions are associated with different respective classifications and at least one of the result-generating functions is used as a default if a classification of the individual user's query cannot be determined.

* * * * *